United States Patent
Schurig

(10) Patent No.: US 6,589,648 B1
(45) Date of Patent: Jul. 8, 2003

(54) MATERIAL COIL, ESPECIALLY STRAPPING MATERIAL COIL

(75) Inventor: Karl Schurig, Remscheid (DE)

(73) Assignee: Signode Bernpak GmbH, Dinslaken (DE)

(*) Notice: Subject to any disclaimer, the term of this patent is extended or adjusted under 35 U.S.C. 154(b) by 0 days.

(21) Appl. No.: 09/318,849

(22) Filed: May 26, 1999

(30) Foreign Application Priority Data

May 26, 1998 (DE) .......................... 198 23 402

(51) Int. Cl.[7] .............................................. B32B 15/04
(52) U.S. Cl. .......................... 428/343; 206/389; 492/56
(58) Field of Search .................... 206/389; 492/56; 428/343

(56) References Cited

U.S. PATENT DOCUMENTS

| | | |
|---|---|---|
| 3,273,817 A | 9/1966 | Damiron |
| 3,414,210 A | 12/1968 | Gaudin |
| 3,865,325 A | 2/1975 | Newcomer, Jr. |
| 4,533,046 A * | 8/1985 | Kuhnert et al. ............. 206/389 |
| 4,651,910 A * | 3/1987 | DeGroot .......................... 225/1 |
| 4,676,446 A * | 6/1987 | Ciocarelli et al. ........ 242/588.4 |
| 4,889,234 A * | 12/1989 | Sorensen et al. ............ 206/459 |
| 4,907,696 A * | 3/1990 | DeCoste, Jr. ................ 206/411 |
| 5,449,539 A * | 9/1995 | Stepanek ....................... 428/40 |
| 5,730,827 A * | 3/1998 | Sewell .......................... 156/269 |
| 5,996,927 A * | 12/1999 | Weirauch et al. .......... 242/556.1 |
| 6,390,411 B1 * | 5/2002 | Chal et al. ................ 242/613.2 |

* cited by examiner

*Primary Examiner*—C. Melissa Koslow
*Assistant Examiner*—Shalie Manlove
(74) *Attorney, Agent, or Firm*—Lowe Hauptman Gilman & Berner, LLP

(57) ABSTRACT

A roll of material, e.g., thermoplastic ribbon comprises a hollow core made of a plastic strip of which the ends are mutually joined by overlapping, and the core's outer surface facing the material to be wound being of a nature opposing slippage of the material on it. The plastic strip includes an adhesive-coated foil of which the adhesive-fitted surface forms the outer core surface facing the material. The first winding layer facing the core bonds to this core and, as a result, the finished roll is made mechanically strong and this strength can be enhanced by an adhesive-coated plastic foil tautly enclosing the outside of the roll and fitted with a projecting, adhesive free or adhesive-neutralized tear-open tab.

20 Claims, 3 Drawing Sheets

MATERIAL COIL, ESPECIALLY STRAPPING MATERIAL COIL

FIELD OF THE INVENTION

The invention relates to a roll of material also called "ribbon roll" and supporting a thermoplastic ribbon of shallow cross-section and generally cross-wound on a hollow core, the ribbon being used for strapping.

BACKGROUND OF THE INVENTION

Rolls of material in the form of lengths of string, bands, ribbons or the like that are made of textile fiber materials, mono-filaments or the like generally comprise a dimensionally stable hollow core and optionally a sleeve or a cuff circumferentially surrounding the outside of the fully wound material.

As regards conventional ribbon rolls, the hollow core consists of a cardboard tube made comparatively thick to assure stability, in particular also against the radial forces exerted by the wound material. Ordinarily the hollow core-side end of the material to be wound on the hollow core is affixed by an adhesive strip to the hollow core, ie to its surface.

Cardboard hollow cores offer the advantage of being fairly economical. On the other hand they incur the drawback of being relatively heavy and foremost that they are significantly bulky, and consequently they entail some cost in shipping and storage. Another and significant drawback concerns their waste disposal because—as a rule—they will be wound with a useless remnant of material. Homogeneous recycling therefore requires to remove the material residues from the cardboard and to dispose separately of the two wastes.

As a rule thermoplastic strapping ribbons are made of polypropylene (PP) or of polyethylene (PE) which are both plastics of which the waste disposal is comparatively problem-free. Regarding the problem of waste disposal, the German patent document U1 93 15 668 appropriately proposes that the roll of material be fitted with a hollow core (therein called inner muff) made of a strip of plastic, in particular PP. The thickness of this plastic sheet is preferably 0.5 to 1 mm, especially 0.7 mm approximately. The hollow core consists of a rigid-flexible strip of such a material with specially shaped end segments allowing to insert one strip end in the form of a tab at the other end of the cut-to-size piece into a slotted aperture in such manner that the cut ends of the cylindrical inner cylinder and so affixed to each other are fixed in place.

This design of the inner hollow core made of a rigid-flexible strip of plastic requires machine processing especially as regards the shaping of the strip ends. Moreover skilled handling is required to form the muff from the plastic strip. The shipping and storage of the inner muff in the form of a plastic strip as yet not transformed into a hollow core indeed have been improved relative to the initially cited state of the art, but even in this technology prefabrication and special storage are expensive.

SUMMARY OF THE INVENTION

Based on the above state of the art, the object of the present invention is essentially to propose a substantially simplified roll of material relative to the state of the art.

The invention solves this problem by providing a plastic strip including an adhesive-coated sheet of which the adhesive fitted surface forms the outside of the hollow core facing the material.

In the first place it is essential for the invention that it distance itself from the heretofore basic concept that the hollow core must be very rigid as a tubular body, for instance like a cardboard shell, or, as regards the inner hollow core of the German patent document U1 93 15 668, that it must be a rigid/flexible structure. Instead the invention is based on the insight that the wound material per se can impart high dimensional strength to the entire roll of material, especially when the surface of the material facing the hollow core is firmly bonded by its first winding layer to this hollow core. Using this insight, the invention in surprising manner manages to make the hollow core from an adhesive coated sheet of a thermoplastic such as polypropylene (PP) or polyethylene (PE), the sheet constituting the hollow core being only $20-30\mu$ thick. In this manner it is possible in simple manner to use the same plastic both for the sheet and for the material to be wound on it, thereby assuring waste disposal of homogeneous materials in absolutely reliable manner. On the other hand a commercial pressure-sensitive adhesive film can be used as the sheet forming the hollow core. Illustratively a pressure sensitive film such as is used for packing tape may be used.

In this respect the invention is characterized by unusual simplicity of configuration, in particular as regards the hollow core.

Furthermore in case the said material is a conventional thermoplastic ribbon for strapping tools, the invention exploits the very nature of the ribbon of which the surface is usually made salient for reasons of strength. The surfaces of the individual wound layers of the ribbon roll therefore lie frictionally against each other and the finished roll will not fall apart even when being moved/shipped horizontally. Again the invention offers in this respect further strengthening by means of a sheet fitted on its side facing the material with an adhesive-coated plastic foil fitted with a projecting, adhesive-free or adhesive-neutralized tear-open tab external to and taut around the material like a sleeve.

Accordingly the invention concerns a simple method to produce a roll of material of the cited kind. This method is characterized by the following steps:

(a) To form the hollow core of the roll of material, an adhesive-coated strip of foil is wound by its surface opposite the adhesive-coated outer surface around a substantially circular-cylindrical support mandril, (b) By bonding overlapping sheet segments (overlap zone) the strip of foil is affixed on the support mandril, (c) The beginning of the material to be wound is attached to the adhesive-coated outer surface of the hollow core, (d) The support mandril is set in rotation about its longitudinal axis until the roll of material has reached the desired quantity of material, and (e) The roll of material is removed from the support mandril, and optionally another step (f) may be carried out before or after step (e), namely (f) An adhesive pressure-sensitive plastic foil is deposited on the outside of the roll of material to act as a circumferential, taut sleeve.

Lastly the invention proposes a device with which to carry out the above method and is characterized in that this device includes a support mandril in the form of an expansion mandril composed of segments which are substantially adjustable radially to axis of rotation and which following preparation of the roll of material can be retracted to decrease the mandril diameter to allow withdrawing the roll of material from the expansion mandril.

When winding the material the handling of the hollow core merely requires the simple expansion mandril. When processing the roll of material, that is supporting it when the material is being used up, no other special devices are used. The conventional winding mandrils or support rollers can be used by means of which heretofore the conventional rolls of material for instance of cardboard were processed into hollow cores.

BRIEF DESCRIPTION OF THE DRAWINGS

The invention is elucidated below in relation to an illustrative embodiment shown in the drawings.

DETAILED DESCRIPTION OF THE INVENTION

Figure 1:
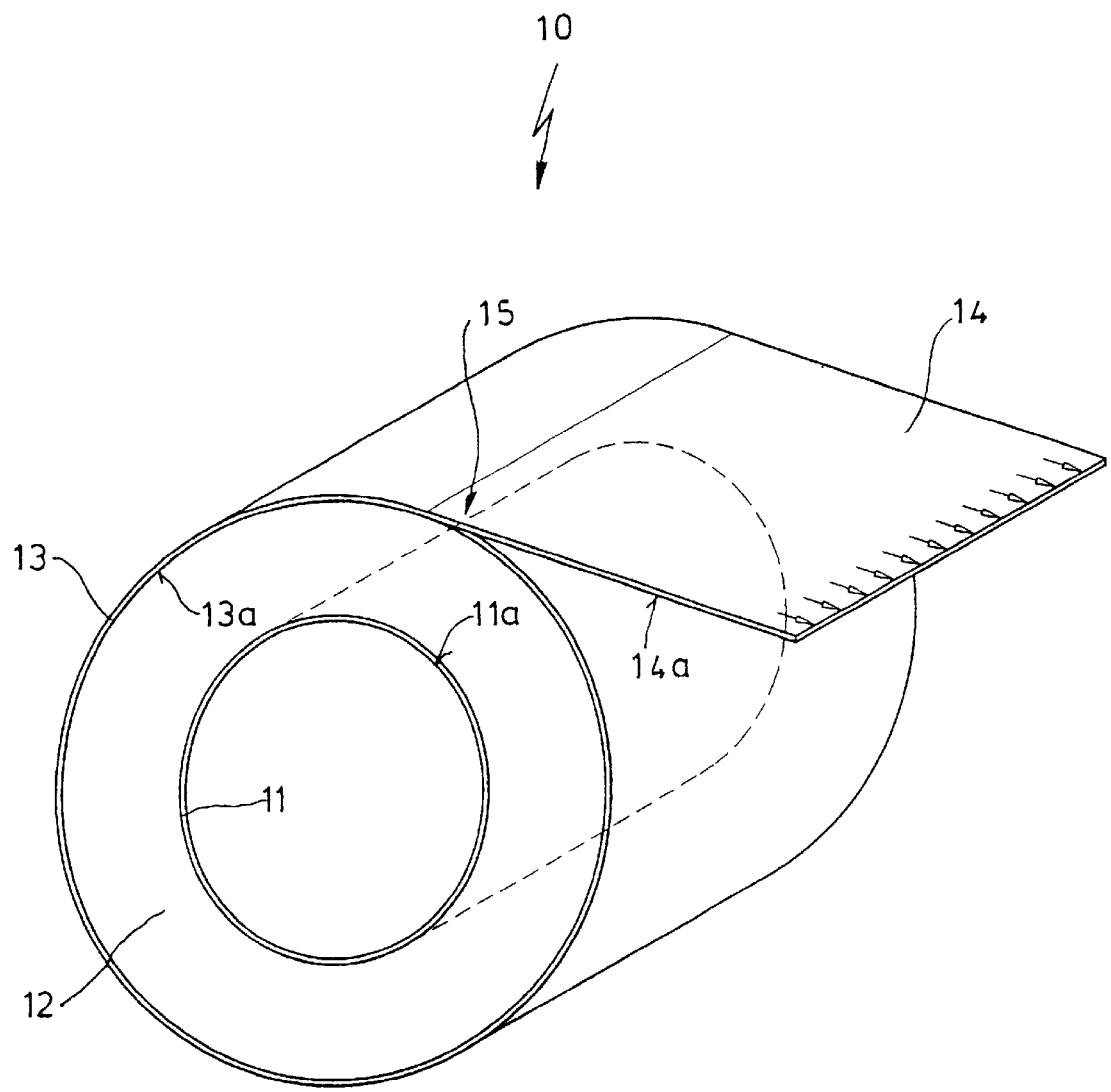
FIG. 1 is a perspective of a finished roll of material.

FIG. 1 shows a finished roll of material denoted by 10. This roll consists of a hollow core 11, the material 12 wound thereon and of a plastic foil 13 surrounding the outside of the wound material 12 in the manner of a sleeve and fitted with a terminal tear-open tab 14.

The hollow core 11 consists of a foil of a cylindrically wound plastic strip fitted with an adhesive coated outer surface 11a. The outer plastic foil 13 also is adhesive-coated on its inside 13a. At its lower surface 14a facing the roll, the tear-open tab 14 comprises either no adhesive coating is illustratively neutralized by a terminal segment 131 of the plastic foil 13 being folded into two plies 132, 133 to form the tear-open tab 14 so that the plastic surface bond to each other. Be it further borne in mind with respect to the highly schematic FIG. 1 that an appropriate overlap must be present in the zone 15 where the tear-open tab 14 first ensures that the pressure-sensitive adhesive plastic strip 13 always shall enclose at least the full outer surface of the wound material 12.

The significant mechanical strength of the roll of material 10 of FIG. 1 results on one hand from the first winding layer of the material 12 close to the hollow core being firmly bonded to the hollow core. Another improvement in strength is implemented by tautly enveloping the finished material 12 with the plastic strip 13. Even when resting on its circular-cylindrical surface, and possibly when being shaken during shipping, such a roll is strong enough not to incur shape degradation.

Figure 2:
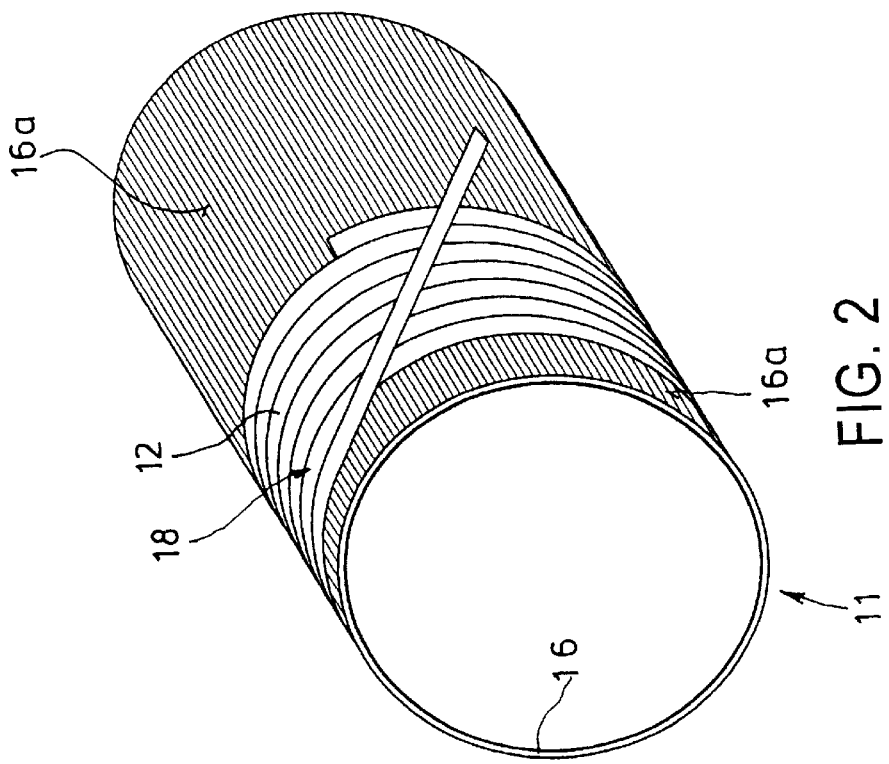
FIG. 2 shows a roll of material when beginning to wind material onto the hollow core.
Figure 4:
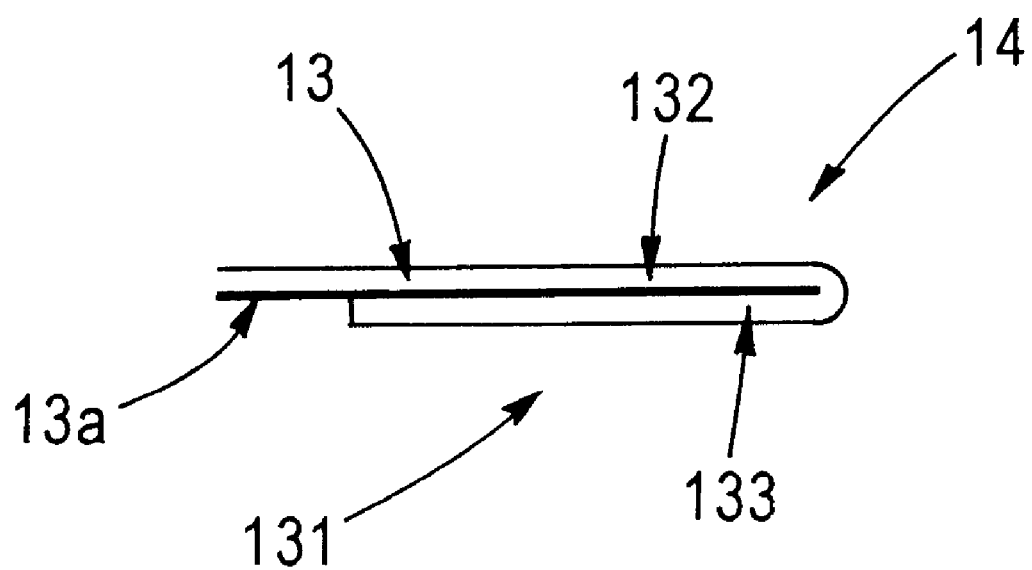
FIG. 4 shows an alternative embodiment of tear-open tab 14 in FIG. 1.

FIG. 2 diagrammatically shows the plastic foil 16 which is adhesive-coated on the outside 16a and which was wound to form the hollow core 11. The overlapping terminal segments are omitted from FIG. 2, however FIG. 3, discussed further below, does diagrammatically show the overlap zone denoted by 17.

As indicated in FIG. 2, the first winding ply 18 of a material 12, in this instance a plastic ribbon of shallow, rectangular cross-section, is deposited directly on the adhesive surface 16a. In the present case winding began at the center of the hollow core and terminates first on the left side as seen in FIG. 2, whereas the next winding is carried out as far as the right end of the hollow core (this is the so-called cross-winding). Relative to the adhesive surface 16a, the first half of the first winding ply and the second half of the second winding ply thus form the ply of material coming into contact with the layer of adhesive. Thereupon winding is carried out to completion and at relatively low tension, ie winding stress, in order to preclude that the wound material undergo inadmissible warping.

Figure 3:
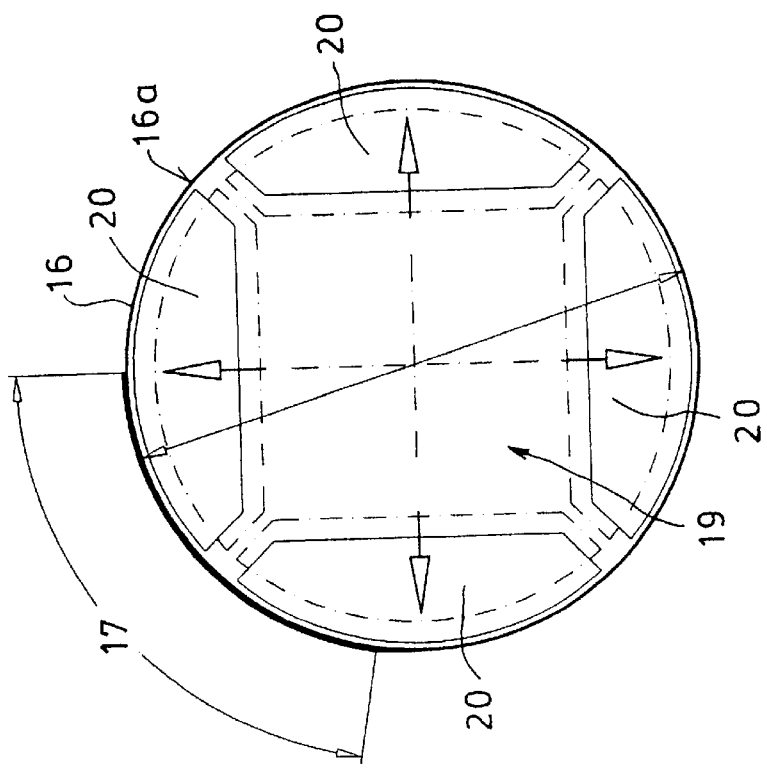
FIG. 3 is a schematic side view of the hollow core being supported on an expansion mandrill.

An expansion mandril 19 which in the embodiment of FIG. 3 comprises four segments 20 substantially adjustable in the radial direction is used to wind the unstable plastic foil 16 into the hollow core 11. When those segments are in their outer positions indicated by solid lines and arrows, the pressure-sensitive foil 16 is wound with its adhesive side 16a facing outward around the outer surfaces of the expanded segments describing approximately a circular cylinder, the mutually touching foil ends being bonded together in the overlap zone 17.

At this time the winding procedure described in relation to FIG. 2 may be initiated and after its termination the segments 20 can be retracted toward the center of the expansible mandril 19 to allow easily removing the finished roll of material from the winding device, or it may be subsequently enclosed with the outer sleeve 13 discussed in relation to FIG. 1.

What is claimed is:

1. A roll of packaging material, comprising a band of said packaging material repeatedly wound upon a separate hollow core to form multiple layers of said packaging material, wherein said hollow core comprises a plastic foil in a rolled configuration in which opposite first and second end portions of the plastic foil overlap each other, the overlapping first and second end portions being bonded together;

an outer surface of said hollow core is provided with an adhesive region; and an innermost layer of said multiple layers is bonded to the outer surface of said hollow core in the adhesive region.

2. The roll of claim 1, wherein the plastic foil is made of a thermoplastic.

3. The roll of claim 2, wherein the thermoplastic includes one of polypropylene (PP) and polyethylene (PE).

4. The roll of claim 1, wherein the plastic foil is made of said packaging material.

5. The roll of claim 3, wherein the plastic foil is from about 20 to about 40 $\mu$m thick.

6. The roll of claim 4, wherein the plastic foil is from about 20 to about 40 $\mu$m thick.

7. The roll of claim 1, wherein the plastic foil is a commercial pressure-sensitive foil.

8. The roll of claim 7, wherein the plastic foil is a length of packing tape.

9. The roll of claim 8, wherein the packing tape is made of polypropylene (PP).

10. The roll of claim 1, wherein the adhesive region is of such a nature that the innermost layer of said band adhering to the adhesive region can be detached therefrom without adhesive particles being transferred to said band.

11. The roll of claim 1, further comprising a sleeve enclosing said packaging material, an outermost layer of said multiple layers being adhered to an inner surface of said sleeve by adhesive.

12. The roll of claim 1, further comprising a sleeve enclosing said packaging material;

said sleeve comprising a plastic sheet having opposite bonded and free ends;

the bonded end and a length of said plastic sheet contiguous thereto being bonded to the outermost layer of said packaging material via an adhesive coated on a major surface of said plastic sheet facing the outermost layer; and the free end forming a projecting tear-open tab which is not bonded to the bonded end, the length of said plastic sheet, or said packaging material.

13. The roll of claim 12, wherein the major surface of said plastic sheet in the vicinity of the free end is free of said adhesive.

14. The roll of claim 12, wherein said adhesive is coated on the major surface of said plastic sheet up to the free end which is folded in two plies so that the plies are bonded to each other by said adhesive.

15. The roll of claim 12, wherein the length of said plastic sheet extends at least 360° circumferentially of said packaging material.

16. A roll of packaging material, comprising a band of said packaging material repeatedly wound upon a separate hollow core to form multiple layers of said packaging material, wherein said hollow core comprises a plastic foil having an adhesive-coated major surface and being rolled so that said adhesive-coated major surface faces outwardly and opposite first and second end portions of the plastic foil overlap each other thereby dividing said adhesive-coated major surface into an overlapped region and an exposed region;

the first and second end portions are bonded together in the overlapped region of said adhesive-coated major surface; and an innermost layer of said multiple layers is bonded to said adhesive-coated major surface in the exposed region.

17. The roll of claim 16, wherein the plastic foil is made of one of polypropylene (PP) and polyethylene (PE), and is from about 20 to about 40 $\mu$m thick.

18. The roll of claim 16, wherein the plastic foil is made of said packaging material and is from about 20 to about 40 $\mu$m thick.

19. The roll of claim 18, wherein said band is wound upon a length of said hollow core which is substantially larger than a width of said band, and the plastic foil extends continuously seamlessly throughout substantially an entire area thereof.

20. The roll of claim 16, wherein successive inner layers, including the innermost layer, of said multiple layers of said packaging material are not bonded to each other.

* * * * *